C. DENTON.
Harvester.

No. 168,326.  Patented Oct. 5, 1875.

Witnesses
Clarence Thurlow
James Thurlow

Inventor
Charles Denton,
(by E. Thurlow his atty
in fact)

UNITED STATES PATENT OFFICE.

CHARLES DENTON, OF PEORIA, ILLINOIS, ASSIGNOR OF ONE-HALF HIS RIGHT TO ANDREW J. HODGES, OF SAME PLACE.

IMPROVEMENT IN HARVESTERS.

Specification forming part of Letters Patent No. 168,326, dated October 5, 1875; application filed March 31, 1875.

*To all whom it may concern:*

Be it known that I, CHARLES DENTON, of the city of Peoria, in the county of Peoria and in the State of Illinois, have invented an Improvement in Harvesters; and do hereby declare that the following is a full, clear, and exact description thereof, reference being had to the annexed drawings making a part of this specification, in which like letters of reference refer to like parts, and in which—

Figure 1:
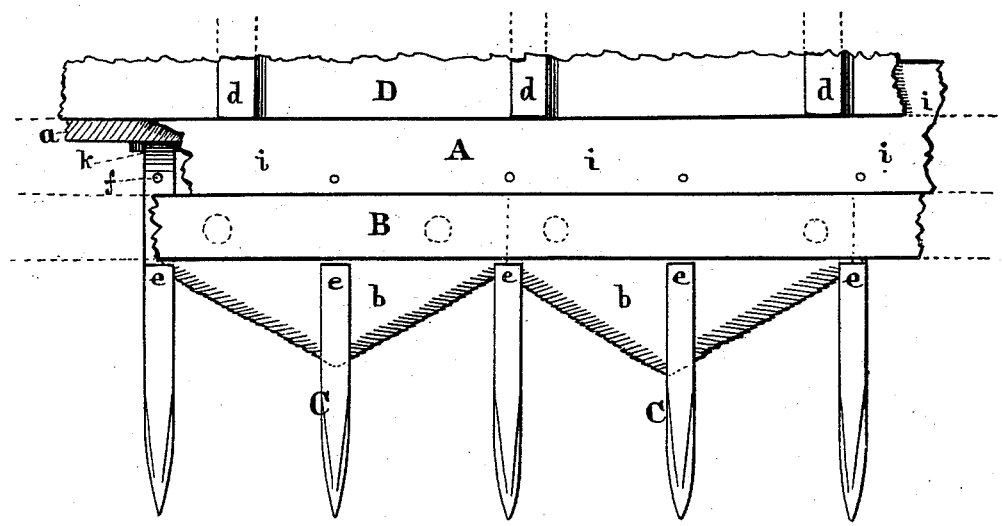
Figure 2:
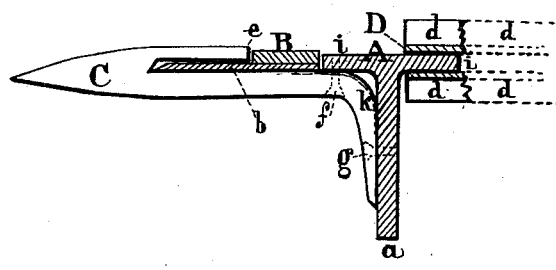

Figure 1 represents a plan view of a section of sickle-bar, sickle, fingers, and edge of the grain-carrier; Fig. 2, a vertical cross-section of the above, along the dotted lines $a\ a\ a\ a$, Fig. 1.

This invention relates to that class of harvesting-machines known as "headers," which are propelled by horses attached to the rear of the machine, and pushing the same before them; and my improvement is confined to sickle-bar and the grain-carrier, and rearrangement of the fingers with regard to the number of the same to each tooth of the sickle.

A difficulty has long been experienced by operators of these machines, in their not being able or fitted to cut grain as near the surface of the ground as desired, and which is often an important object, under some circumstances, to do, notwithstanding the primary intention of a header may be to cut grain without the straw, and also at the same time in not getting the cut grain to fall properly upon the canvas carrier, in such a manner as to insure its being elevated, as fast as cut, into the attendant wagon; and also in the difficulty of so placing the guards or fingers relatively to the sickle-teeth as to obtain a continuous and regular cut of the latter.

In order to remedy the first-named difficulty I use a small iron bar, called the "finger-bar," of peculiar construction, (being T-shaped in cross-section,) and by running the carrier or grain-conveyer along the top of the same thus bring it in direct contact or immediately under the falling cut grain, so as to carry the same off without clogging or choking the sickle-bar or fingers. By passing the canvas carrier along the top of the finger-bar, which I make project horizontally backward for this purpose, and allowing the canvas to return thereunder, I am enabled to cut grain close down to the ground when the grain is prostrated by the weather, and which would otherwise be a loss, unless laboriously reaped by hand. This is done by tilting the platform, by the usual means, in the arc of a circle, until the fingers pass under the "lodged" stalks, permitted by the vertical contraction of the sickle-bar and draper, which now occupy the small angle formed between the platform or its fingers and the ground.

The second-named difficulty I obviate by allotting two guards or fingers to every section of the sickle, (admitting, however, that many machines are constructed with one finger to each section or tooth of its sickle,) thus relieving the sickle-knife of at least two-thirds of the ordinary lateral motion, or motion required under the common arrangement.

In the drawings, which represent one of the forms in which I construct this invention, A represents the finger-bar, made with a horizontal upper flat portion, $i$, with a supporting vertical flange, $a$, extending below, together presenting the form of a Roman letter T in vertical section. B represents the sickle-bar, composed of the usual flat rod and attached teeth $b\ b$, &c., or sections, vibrating within the usual recess between the finger-bar and the returned ends of the fingers C C, &c., which same are of the common shape, attached by a screw, $f$, to the under side of the horizontal table $i$ of the finger-bar A, or by a rivet or other simple device, and also by a screw or rivet, $g$, to the vertical flange $a$ of said bar. D represents the canvas carrier, having the usual conveying-bars $d\ d$, and overlapping or covering the inner edge of the table $i$ of the finger-bar from end to end, approaching within an inch of the sickle itself, or thereabout, and parallel therewith. The carrier may run upon rollers at the end of said finger-bar, and its canvas and rods will be still sufficiently protected by the vertical flange $a$ of the said bar A, so as to cut off grain close to the ground.

The advantages of this improvement are, first, that it allows the sickle to be brought much nearer the ground, as the carrier is made to pass close under the table $i$ of the finger-bar in returning; second, also in carrying the cut grain off without clogging, by causing the carrier to overlap the table of said finger-bar, and approach the sickle more closely; third, also, by placing two fingers at each tooth, securing a continuous and regular cut with less lateral motion of the sickle. More advantages might be enumerated, but these given are sufficient for the purpose.

What I claim as my invention is—

1. The finger-bar having an uninterrupted plane surface, and provided at right angles with a downward-projecting rib for supporting and attaching the fingers thereto, substantially as set forth.

2. The combination of a grain-carrier with the finger-bar having an uninterrupted plane surface, and provided at right angles with a downward-projecting rib, substantially as and for the purpose set forth.

In testimony that I claim the foregoing improvement in harvesters I have hereunto set my hand this 13th day of March, A. D. 1875.

CHARLES DENTON.

Witnesses:
H. P. WILBER,
J. M. MORSE.